UNITED STATES PATENT OFFICE.

WILLIAM BACHMAN CHISOLM, OF CHARLESTON, SOUTH CAROLINA.

METHOD OF MAKING FERTILIZING MATERIAL.

No. 824,281.  Specification of Letters Patent.  Patented June 26, 1906.

Application filed September 19, 1904. Serial No. 225,103.

*To all whom it may concern:*

Be it known that I, WILLIAM BACHMAN CHISOLM, a citizen of the United States, residing in Charleston, county of Charleston, State of South Carolina, have invented certain new and useful Improvements in Methods of Making Fertilizing Material; and I do hereby declare the following to be a full, clear, and exact description of the invention, such as will enable others skilled in the art to which it appertains to make and use the same.

In an application filed by me of even date herewith I have described the production of a fertilizing agent having as a constituent part thereof a homogeneous mixture of phosphate rock or phosphate material and sulfur in the form of an impalpable powder. The extra fineness of the particles of phosphatic rock and sulfur entering into this homogeneous mixture is one of the determining factors in the efficiency of the mixture both in the exercise of its function as fertilizing agent proper and as a germicide.

Sulfur appears on the market in two forms—first, in the sublimed form known as "flowers of sulfur" of very high grade and also of relatively high cost in view of the method pursued in producing it, and, secondly, in solid or lump form of lower grade and of much less cost. Prior to my present invention, however, so far as I am aware, it has been impossible to grind this lesser grade of lump sulfur to anything near the desired grade of fineness desirable for the practice of my invention, for the reason that the sulfur when placed in the grinding-mill has a tendency to maintain the cohesion of its particles as against the reducing action of the mill, so that the resulting product of an attempt to grind the sulfur is a mixture of coarse flakes and large particles unsuited to the uses contemplated by me.

My present invention resides in the discovery that solid or lump sulfur can be reduced to the form of an impalpable powder, as specified, by first crushing it roughly and grinding it in a mill together with crushed phosphatic rock, with the resultant effect that the sulfur particles are not only reduced to the degree of fineness desired, but that they are intimately and homogeneously intermixed with similarly-reduced particles of phosphatic rock. The hard sharp angles of the phosphatic rock during the reducing operation apparently subserve the function of minutely subdividing the sulfur and by interposing themselves between the sulfur particles preventing the flaking which would result were it attempted to grind the sulfur alone.

In the practice of my invention for the production of the fertilizing and germicidal agent desired I first roughly crush a batch of phosphatic rock or phosphatic material and sulfur in the proportions of, say, forty to one hundred pounds of sulfur to two thousand pounds of the mixture of which it forms a part. The crushed mixture I then subject to the action of a Lucop mill or other grinding-mill of an analogous type in regulated quantity and grind the mixture to an impalpable powder, the tailings being retained by the screens and returned to the mill for regrinding.

Having thus described my invention, what I claim is—

1. The method of preparing a substantially impalpable powder for use in fertilizers, which consists in mixing and grinding sulfur together with phosphate rock, or phosphatic material; substantially as described.

2. The process of grinding sulfur to a substantially impalpable powder and simultaneously effecting its intimate homogeneous admixture with phosphate rock, or phosphatic material, which consists in first roughly crushing the sulfur and phosphate rock, or phosphatic material, before grinding, and then subjecting them together to the grinding operation; substantially as described.

In testimony whereof I affix my signature in presence of two witnesses.

WILLIAM BACHMAN CHISOLM.

Witnesses:
JOHN D. MULLER,
L. W. WHITING.